No. 629,545. Patented July 25, 1899.
B. G. CALL.
VESSEL COVER AND FASTENING FOR SAME.
(Application filed Apr. 7, 1898.)
(No Model.) 2 Sheets—Sheet 1.

No. 629,545. Patented July 25, 1899.
B. G. CALL.
VESSEL COVER AND FASTENING FOR SAME.
(Application filed Apr. 7, 1898.)

(No Model.) 2 Sheets—Sheet 2.

Witnesses.

Inventor.
Benjamin G. Call,
by Wm. F. Booth
his Attorney

UNITED STATES PATENT OFFICE.

BENJAMIN G. CALL, OF SAN FRANCISCO, CALIFORNIA, ASSIGNOR OF ONE-HALF TO EDWARD N. RICHARDSON, OF SAME PLACE.

VESSEL-COVER AND FASTENING FOR SAME.

SPECIFICATION forming part of Letters Patent No. 629,545, dated July 25, 1899.

Application filed April 7, 1898. Serial No. 676,726. (No model.)

*To all whom it may concern:*

Be it known that I, BENJAMIN G. CALL, a citizen of the United States, residing in the city and county of San Francisco and State of California, have invented certain new and useful Improvements in Vessel-Covers and Fastenings for Same; and I do hereby declare the following to be a full, clear, and exact description of the same.

My invention relates to hermetically-sealed or gas-tight covers for cans, tanks, reservoirs, and other vessels containing milk, beer, or other beverages or liquids, or any substances or materials requiring hermetical closure either to exclude air or to confine gases.

My invention consists in a novel construction of the clamp-stem, adapting it for the seating of certain valves required when the vessel is used for containing and dispensing beer and other gas-impregnated liquids and in the combination of said valves with said clamp-stem and the lid or cap forming the cover, all of which I shall hereinafter fully describe.

One object is to adapt my cover for use upon such vessels as contain steam-beer and other gas-laden liquids and from which they are dispensed, said use requiring the employment of suitable gas-regulating valves, which in my invention find a perfectly-adapted place in the clamp-stem of the cover device.

Figure 1:
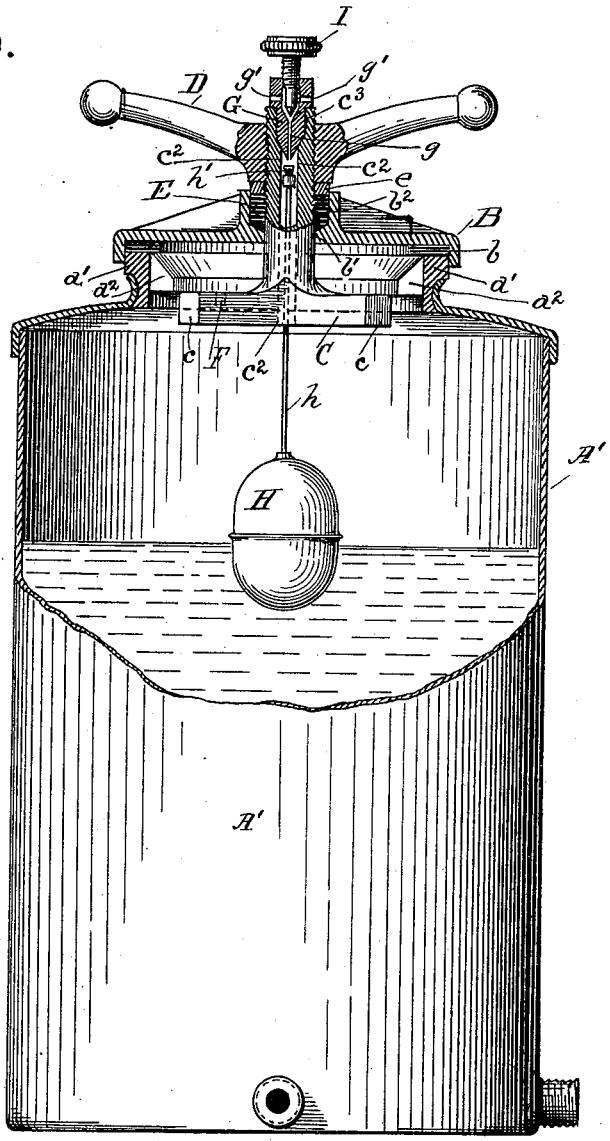
Figure 2:
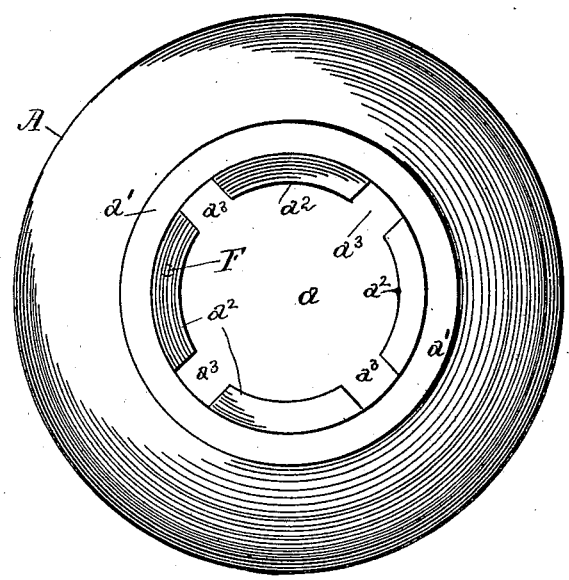

Referring to the accompanying drawings, Figure 1 is a sectional view showing the application of my cover and fastening to and the necessary valves for a vessel to contain steam-beer or other gas-impregnated liquid. Fig. 2 is a top view of the vessel's mouth.

A is a vessel which may be of any kind requiring by reason of its use a hermetically-sealed cover. The mouth $a$ of this vessel is bounded by a rim $a'$, and down within the mouth is a fixed lug or shoulder $a^2$, which is here shown as being made in separated sections. There may be only one lug or shoulder, or it may consist of an encircling lug divided into sections, two or more in number, whereby spaces $a^3$ are left between the adjacent ends of the sections for the passage of the arms of the clamp to be presently described. If said clamp have four arms, then the lug or shoulder $a^2$ will have four sections, as I have shown in Fig. 2.

B is the lid or cap. It is a flanged lid adapted to slip over the rim $a'$ of the vessel A and to find a seat thereon through the intervention of the washer or gasket $b$. The lid has a central boss with a hole $b'$ and a recess or box $b^2$ for packing.

C is the clamp. It may have any number of arms $c$, preferably four, as shown. It has a central stem $c'$ rising through the apertured center of lid B, and said stem is exteriorly threaded, as shown.

D is a handled nut fitted upon stem $c'$.

E is a packing of rubber or other suitable material fitted in the seat or box $b^2$ of the lid and having a wearing-ring $e$ on its top.

F is a stop-pin located under the lug or shoulder $a^2$ in the vessel and lying in the path of movement of the clamp-arms.

The operation of these parts is as follows: The clamp-arms $c$ are passed down in the spaces $a^3$ between the sections of the lug or shoulder $a^2$, and when under said lug or shoulder are then turned through a partial revolution to come under the lug or shoulder. The stop-pin F limits this movement conveniently to prevent too great a travel, which might carry the arms into alinement with succeeding spaces $a^3$. Now the lid being on the clamp-stem and fitted to its place over the rim of the vessel's mouth, the handled nut D is turned down until it bears upon the wearing-ring $e$ of the packing E. Further movement of the nut now causes the packing E to bind tightly about the clamp-stem, thus making the journal between said stem and the lid air and gas tight. At the same time the downward pressure of the nut pulls up on the clamp, causing its arms to bear up tightly under the lug or shoulder $a^2$, and it forces down the lid with an equal pressure all around until said lid is firmly and evenly pressed down upon the gasket $b$ and forms the necessary hermetic seal. To relieve the lid, the nut is turned up, and the clamp being turned back to cause its arms to aline with the spaces $a^3$ all the parts may be removed from the vessel by simply lifting them from and off its mouth. Thus both the application and the relief of the cover are effected easily and rapidly and without the use of special tools or a tool of any kind, and the joints formed are perfectly tight.

In vessels used for dispensing liquids like steam-beer regulating-valves to control the supply, the quantity and pressure of the gas, and its relief are necessary. I shall now describe my improvements in this regard whereby, in connection with my cover, I am enabled to attain the required results. For this purpose I show in Fig. 1 a vessel A' of that description usually used for dispensing steam-beer. I make an opening $c^2$ through the clamp-stem from end to end. In its upper portion this opening is enlarged and is provided with screw-threads, as shown at $c^3$. Into these threads is screwed an inverted cone G, having a passage $g$ through it in the line of its axis. This passage may be as small as required. Within the vessel A' is a float H, the stem $h$ of which is guided up through the opening $c^2$ in the clamp-stem, and it carries a valve $h'$ on its upper end adapted by contact with and removal from the apex of the cone G to close and to open the passage $g$ of said cone. Screwed into the upper end of the cone G is a point-valve I, which is adapted to control the upper end of passage $g$. When screwed down, the point-valve I closes passage $g$. When screwed up, it opens it, and the gas may escape by following the screw-threads or directly out through suitable side apertures, such as $g'$, in the head of the cone-piece.

The automatic action of the float-valve and cone and their control of the liquid-supply and gas-pressure are well known, and as they form of themselves no part of my invention it will be sufficient to say that as the gas in vessel A' accumulates and by its increasing pressure prevents the inflow of the liquid, and thereby reduces its level, the float descending opens the cone-passage and permits the escape of the gas. The pressure is thereby reduced, and the liquid will flow in to that level found best to preserve in the vessel a sufficient quantity of liquid for drawing and settling purposes, whereupon the rising float by closing its valve against the cone-passage will cut off the escape of the gas and will check the inflow of the liquid at the proper level. Heretofore these parts, necessary to this automatic control, have all been located within the vessel, the cone being screwed down through the common screw or other cap of the vessel and a depending sleeve being used, forming a guide for the float-stem. In such location they occupied the position necessary for the clamp and its stem of my cover device. To avoid this conflict, I have seated these parts within my clamp-stem, thus permitting their use with my cover and also taking the valve portion out of the can and up to the outside, where it can be most conveniently reached. In addition to this combination I have included the novel feature of the point-valve I, by which a control and check for the escaping gas can be had by hand and to any extent desired.

Having thus described my invention, what I claim as new, and desire to secure by Letters Patent, is—

1. The combination with a vessel having a mouth, shoulders within said mouth, an exterior cap provided with a hole, a clamp member having radial arms adapted to engage said shoulders and an upwardly-projecting screw-threaded stem extending through said hole in the cap and provided with a passage therethrough, a nut on the clamp-stem, a valve-seat in the upper part of said passage, a stem having a valve thereon working in said passage, and means within the vessel for operating said valve, substantially as described.

2. In combination with the lid or cap, the underlying clamp having a stem with an opening through it, said stem extending through the lid or cap, a lug or shoulder within the vessel, with which the clamp engages, and the nut on the clamp-stem for tightening the clamp and lid or cap, the cone-piece seated in the upper portion of the clamp-stem opening and having a passage through it, and the float in the vessel having a stem guided in the opening of the clamp-stem and carrying a valve on its upper end adapted to control the passage through the cone-piece.

3. In combination with the lid or cap, the underlying clamp having a stem with an opening through it, said stem extending through the lid or cap, a lug or shoulder within the vessel with which the clamp engages, and the nut on the clamp-stem for tightening the clamp and lid or cap, the cone-piece seated in the upper portion of the clamp-stem opening and having a passage through it, the float in the vessel having a stem guided in the opening of the clamp-stem and carrying a valve on its upper end adapted to control the passage through the cone-piece, and the valve, seated in the cone-piece and adapted to control the upper end of its passage.

In witness whereof I have hereunto set my hand.

BENJAMIN G. CALL.

Witnesses:
 D. B. RICHARDS,
 WALTER F. VANE.